United States Patent
Fraidlin et al.

(10) Patent No.: US 6,239,993 B1
(45) Date of Patent: May 29, 2001

(54) CIRCUIT ASSOCIATED WITH A POWER CONVERTER AND METHOD OF OPERATION THEREOF

(75) Inventors: Simon Fraidlin, Plano, TX (US); Andrey Frolov, Moscow (RU); Sergey Louzanov; Anatoliy Polikarpov, both of Mesquite, TX (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/602,416

(22) Filed: Jun. 23, 2000

(51) Int. Cl.[7] .................................................. H02H 7/122
(52) U.S. Cl. ......................... 363/56.03; 363/132; 363/17
(58) Field of Search .......................... 363/17, 55, 56.03, 363/56.04, 132, 58

(56) References Cited

U.S. PATENT DOCUMENTS

| | | | |
|---|---|---|---|
| 5,303,137 | * | 4/1994 | Peterson .................................. 363/17 |
| 5,402,329 | | 3/1995 | Wittenbreder, Jr. ...................... 363/16 |
| 5,448,467 | * | 9/1995 | Ferreira .................................. 363/17 |
| 5,612,860 | * | 3/1997 | Meszlenyi ............................... 363/17 |

OTHER PUBLICATIONS

"A Simple Clamped ZVS PWM Converter" by Ernest H. Wittenbreder; 1993 IEEE; pp. 715–721 No month.

* cited by examiner

*Primary Examiner*—Shawn Riley

(57) ABSTRACT

A circuit associated with a power converter, a method of operation thereof and a power converter employing the circuit or the method. The power converter has a primary switching circuit coupled to a tapped primary winding of an isolation transformer and a rectifier coupled to a secondary winding of the isolation transformer. The circuit is coupled across a tapped portion of the tapped primary winding. In one embodiment, the circuit includes: (1) an inductor, configured to reduce current spikes in the primary switching circuit caused by a reverse recovery phenomenon associated with the rectifier and to effect substantially zero voltage switching of a power switch of the primary switching circuit; and (2) a diode, coupled to the inductor via the tapped portion, configured to clamp a voltage across the rectifier. The tapped portion is configured to enable energy from the inductor to be recovered within the power converter.

20 Claims, 2 Drawing Sheets

CIRCUIT ASSOCIATED WITH A POWER CONVERTER AND METHOD OF OPERATION THEREOF

TECHNICAL FIELD OF THE INVENTION

The present invention is directed, in general, to power conversion and, more specifically, to a circuit for reducing losses associated with an isolated power converter, a method of operating the circuit and a power converter employing the circuit or the method.

BACKGROUND OF THE INVENTION

The development of high-efficiency power supplies in combination with a requirement of higher power density is a continuing goal in the field of power electronics. A switched-mode power converter is a frequently employed component of a power supply that converts an input voltage waveform into a specified output voltage waveform. There are several types of switched-mode power converters including, for instance, an asymmetrical half-bridge power converter.

A conventional asymmetrical half-bridge power converter includes two power switches coupled to a controller, at least one isolation transformer, a voltage balancing capacitor, a rectifier and a filter. The asymmetrical half-bridge power converter generally operates as follows. The first and second power switches conduct current in a complimentary manner, with generally unequal duty cycles, to convert an input DC voltage into an AC voltage to be applied across the isolation transformer. Any DC component of the voltage applied to a primary winding of the isolation transformer is blocked by the voltage balancing capacitor coupled in series with the primary winding of the isolation transformer. The rectifier then rectifies a secondary voltage from the isolation transformer and the filter smooths and filters the rectified voltage to develop an output voltage for delivery to a load. The controller monitors the output voltage of the asymmetrical half-bridge power converter and adjusts the duty cycle of the power switches to ultimately control the output voltage. The output voltage may be maintained at a relatively constant level despite relative fluctuations in the input voltage and the load.

The asymmetrical half-bridge power converter is a well known power circuit topology that, when operating in a flyback mode, may be capable of zero voltage switching (ZVS) operation. A high magnetizing current, usually exceeding twice the load current, however, may be required to attain ZVS operation. Further, one or more of the power switches may be subject to current spikes induced therein by the reverse recovery of the rectifier.

In U.S. Pat. No. 5,402,329, entitled, "Zero Voltage Switching Pulse Width Modulated Power Converters, incorporated herein by reference, Wittenbreder suggests placing an inductor in series with the primary winding of the isolation transformer. One of the ZVS transitions is driven by a combination of the magnetic energy stored in the transformer and the magnetizing energy stored in the inductor. The other ZVS transition is driven by energy stored in the inductor. While the series inductance may allow for ZVS operation with lower magnetizing currents, the inductor may cause spurious voltage spikes across the rectifier during reverse recovery.

Accordingly, what is needed in the art is a circuit, employable with a variety of power converter topologies, that reduces voltage spikes across a rectifier of the power converter during a reverse recovery phenomenon and advantageously recovers energy from the inductor to increase an efficiency of the power converter.

SUMMARY OF THE INVENTION

To address the above-discussed deficiencies of the prior art, the present invention provides, a circuit for reducing losses associated with a power converter, a method of operating the circuit and power converter employing the circuit or the method. The power converter has a primary switching circuit coupled to a tapped primary winding of an isolation transformer and a rectifier coupled to a secondary winding of the isolation transformer. The circuit is coupled across a tapped portion of the tapped primary winding. In one embodiment, the circuit includes (1) an inductor, configured to reduce current spikes in the primary switching circuit caused by a reverse recovery phenomenon associated with the rectifier and to effect substantially zero voltage switching of a power switch of the primary switching circuit; and (2) a diode, coupled to the inductor via the tapped portion, configured to clamp a voltage across the rectifier. The tapped portion is configured to enable energy from the inductor to be recovered within the power converter.

The present invention introduces, in one aspect, a circuit capable of reducing current spikes in the primary switching circuit and voltage spikes across the rectifier associated with the reverse recovery phenomenon and recovering energy associated therewith to increase an efficiency of the power converter.

In one embodiment of the present invention, the power converter is an asymmetric half-bridge power converter. Of course, other power converter topologies are well within the broad scope of the present invention. In a related embodiment, the tapped portion is configured to deliver the energy from the inductor to a capacitor of the asymmetrical half-bridge power converter. The energy may thus be recuperated within the power converter to increase an efficiency thereof.

In one embodiment of the present invention, the inductor is coupled to an end tap of the tapped primary winding, while the diode is coupled to an intermediate tap of the tapped primary winding. In an alternative embodiment, the diode is coupled to the end tap of the tapped primary winding, while the inductor is coupled to the intermediate tap of the tapped primary winding. Of course, other circuit configurations may be possible and are well within the scope of the present invention.

In one embodiment of the present invention, the power converter further includes a controller configured to control conduction intervals of the power switch. In a related embodiment, the controller is configured to monitor an output voltage of the power converter and to control the power switch in response thereto. The output voltage of the power converter may thus be regulated despite variations in the input voltage or the load. Of course, the controller may monitor other characteristics associated with the power converter as desired and control the power switch as a function thereof.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
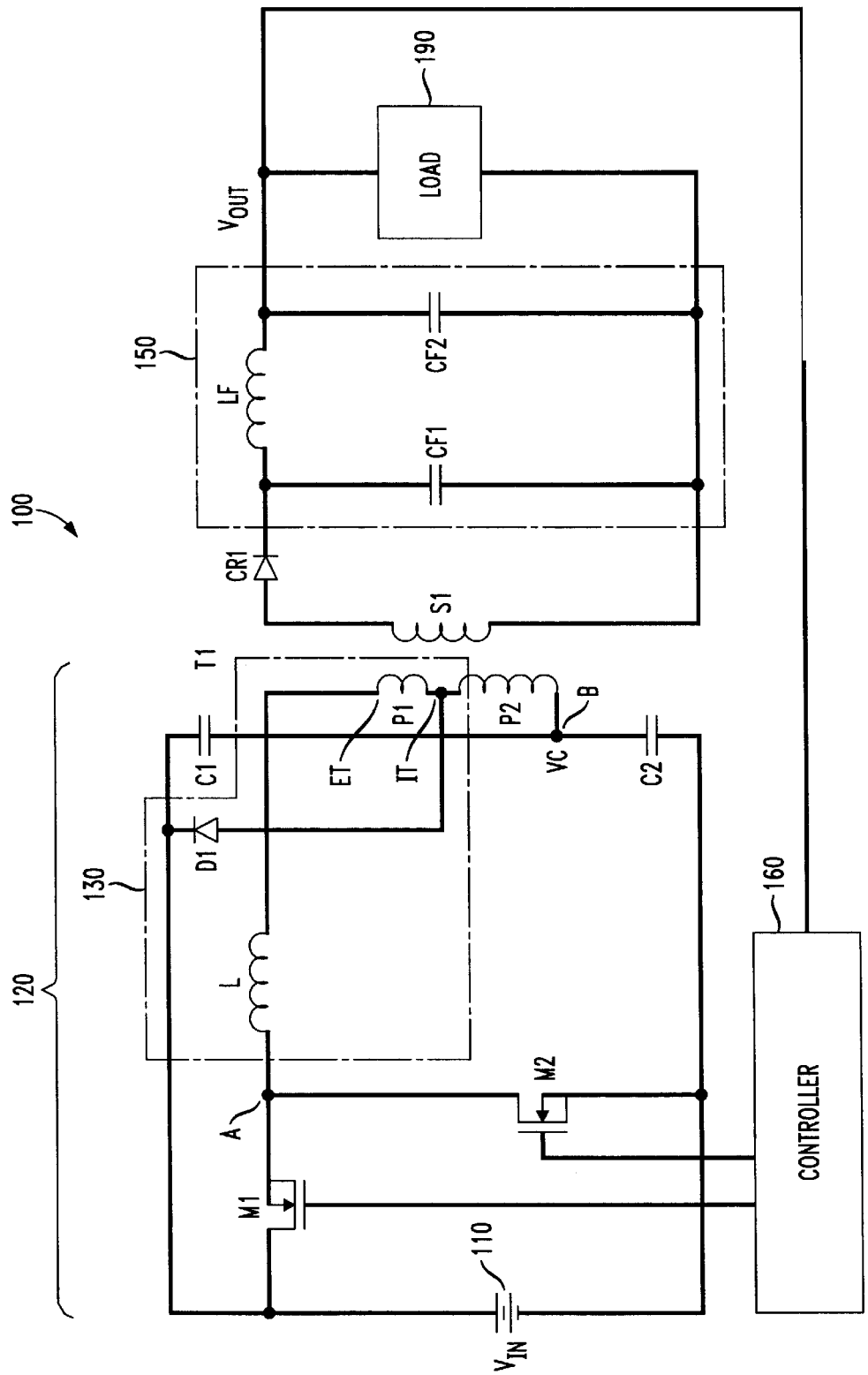
FIG. 1 illustrates a schematic diagram of an embodiment of an asymmetrical half-bridge power converter constructed in accordance with the principles of the present invention.

Referring initially to FIG. 1, illustrated is a schematic diagram of an embodiment of an asymmetrical half-bridge power converter 100 constructed in accordance with the principles of the present invention. The power converter 100 has an input couplable to a source of electrical power 110 having an input voltage $V_{IN}$. The power converter 100 provides an output voltage $V_{OUT}$ to a load 190 coupled to an output thereof.

The power converter 100 includes an isolation transformer T1 having a tapped primary winding (with first and second tapped portions P1, P2) and a secondary winding S1. The power converter 100 further includes a primary switching circuit 120 coupled to the tapped primary winding. The power converter 100 further includes a rectifier CR1 coupled to the secondary winding S1. The power converter 100 further includes an output filter 150, having a first filter capacitor CF1, a filter inductor LF and a second filter capacitor CF2, coupled across the output.

The primary switching circuit 120 employs a half-bridge topology, including first and second power switches M1, M2 series-coupled across the input. In the illustrated embodiment, the first and second power switches M1, M2 are metal oxide semiconductor field-effect transistors (MOSFETs). Of course, other types of switches, including bipolar junction transistors (BJTs), are well within the broad scope of the present invention. The primary switching circuit 120 further includes first and second capacitors C1, C2 series-coupled across the first and second power switches M1, M2. The tapped primary winding is coupled between a first node A intermediate the first and second power switches M1, M2 and a second node B intermediate the first and second capacitors C1, C2.

The power converter 100 further includes a controller 160 that monitors the output voltage $V_{OUT}$ and adjusts relative duty cycles of the first and second power switches M1, M2 to regulate the output voltage $V_{OUT}$ despite fluctuations in the input voltage $V_{IN}$ or the load 190. Of course, the controller 160 may monitor other characteristics associated with the power converter 100 as desired.

While the power converter 100 may be capable of zero voltage switching (ZVS) operation, a high magnetizing current, usually exceeding twice the load current may be required. Further, the first and second power switches M1, M2 may be subject to current spikes induced therein by the reverse recovery of the rectifier CR1. The power converter 100, therefore, further includes a circuit 130 coupled across the first tapped portion P1.

In the illustrated embodiment, the circuit 130 includes an inductor L coupled to an end tap ET of the first tapped portion P1. The inductor L is configured to reduce current spikes in the first and second power switches M1, M2 of the primary switching circuit 120 caused by a reverse recovery phenomenon associated with the rectifier CR1. The inductor L is further configured to allow for ZVS operation with lower magnetizing currents. The inductor L, however, may cause spurious voltage spikes across the rectifier CR1 during reverse recovery. The circuit 130 therefore further includes a diode D1 coupled to the inductor L via the first tapped portion Pi. In the illustrated embodiment, the diode D1 is coupled to an intermediate tap IT between the first and second tapped portions P1, P2. The diode D1 is configured to clamp a voltage across the rectifier CR1. The presence of the first tapped portion P1 enables energy from the inductor L to be recovered within the power converter 100, rather than dissipated.

The power converter 100 operates as follows. The first and second power switches M1, M2 conduct current in a complimentary manner, with generally unequal duty cycles, to convert the input voltage $V_{IN}$ into an AC voltage to be applied across the tapped primary winding of the isolation transformer T1. The rectifier CR1 then rectifies a secondary voltage from the secondary winding Si and the output filter 150 smooths and filters the rectified voltage to develop the output voltage $V_{OUT}$.

Prior to the start of a primary interval, the second power switch M2 is ON and current in the primary switching circuit 120 circulates through the second power switch M2, the second capacitor C2, the tapped primary winding and the inductor L. Energy is transferred to the output via the rectifier CR1 and the output filter 150.

The second power switch M2 is then turned OFF, causing the current through the tapped primary winding and the inductor L to now circulate through a body diode (not shown) of the first power switch M1 and the first capacitor C1. The current from the inductor L discharges a parasitic capacitance of the first power switch M1 to allow the first power switch M1 to be turned ON with substantially zero volts thereacross. Since the current is circulating through the tapped primary winding and the inductor L in the same direction, energy continues to be transferred to the output.

With the first power switch M1 ON, however, a portion of the input voltage $V_{IN}$ is applied across the tapped primary winding in the opposite direction. The current in the inductor L decreases to zero and reverses direction.

A reverse voltage across the rectifier CR1 effectively couples the secondary winding S1 across the output of the power converter 100. Due to its recovery, the rectifier CR1 presents a low impedance, allowing a voltage equivalent to the input voltage $V_{IN}$ less a voltage VC (at the second node B between the first and second capacitors C1, C2) to be applied to the inductor L. The current in the inductor L ramps up substantially, allowing a portion of the energy associated with the reverse recovery phenomenon experienced by the rectifier CR1 to be stored in the inductor L.

Once the rectifier CR1 has recovered, the energy stored in the inductor L would conventionally cause spurious voltage spikes across the rectifier CR1. The diode D1, however, turns ON due to the substantial current flowing through the inductor L. A voltage across the first capacitor C1 is applied across the first tapped winding P1. In the illustrated embodiment, the first tapped winding P1 has less turns than the second tapped winding P2. A voltage across the second tapped winding P2 is therefore greater than a voltage across the first tapped winding P1, causing the current in the inductor L to ramp down quickly until it is substantially equal to the magnetizing current through the tapped primary winding. The diode D1 then turns OFF. The current through the inductor L now ramps up slowly. The first power switch M1 is turned OFF and the second power switch M2 is turned ON to allow energy to be transferred to the rectifier CR1 and the output filter 150.

The diode D1 effectively clamps the tapped primary winding, thus clamping the voltage across the rectifier CR1. Since the diode D1 is coupled to the intermediate tap IT between the first and second tapped portions P1, P2, the first tapped portion P1 may, in the illustrated embodiment, operate as a current transformer to recover energy from the inductor L into the first and second capacitors C1, C2 in a substantially lossless manner. By coupling the diode D1 to the intermediate tap IT between the first and second tapped portions P1, P2, the reverse voltage across the rectifier CR1 is increased by an increment equal to the ratio of a number of windings of the first tapped portion P1 divided by the sum of the number of windings of the first and second tapped portions P1, P2.

Figure 2:
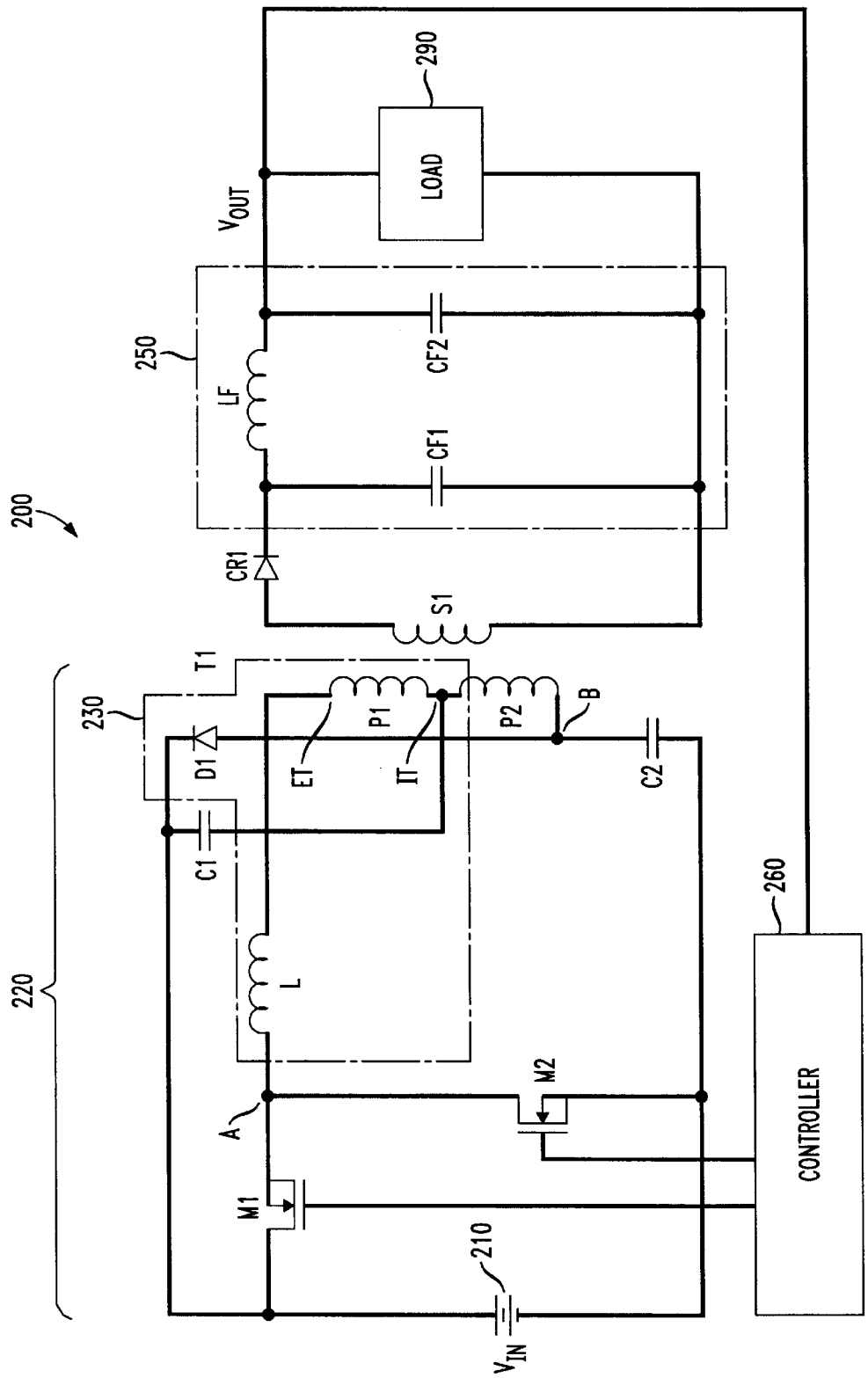
FIG. 2 illustrates a schematic diagram of another embodiment of an asymmetrical half-bridge power converter constructed in accordance with the principles of the present invention.

Turning now to FIG. 2, illustrated is a schematic diagram of another embodiment of an asymmetrical half-bridge power converter 200 constructed in accordance with the principles of the present invention. The power converter 200 has an input couplable to a source of electrical power 210 having an input voltage $V_{IN}$. The power converter 200 provides an output voltage $V_{OUT}$ to a load 290 coupled to an output thereof.

The power converter 200 includes an isolation transformer T1 having a tapped primary winding (with first and second tapped portions P1, P2) and a secondary winding S1. The power converter 200 further includes a primary switching circuit 220 coupled to the tapped primary winding. The power converter 200 further includes a rectifier CR1 coupled to the secondary winding S1. The power converter 200 further includes an output filter 250, having a first filter capacitor CF1, a filter inductor LF and a second filter capacitor CF2, coupled across the output.

The primary switching circuit 220 employs a half-bridge topology including first and second power switches M1, M2 series-coupled across the input. The primary switching circuit 220 further includes first and second capacitors C1, C2 series-coupled across the first and second power switches M1, M2. The tapped primary winding is coupled between a first node A intermediate the first and second power switches M1, M2 and a second node B intermediate the first and second capacitors C1, C2.

The power converter 200 further includes a controller 260 that monitors the output voltage $V_{OUT}$ and adjusts relative duty cycles of the first and second power switches M1, M2 to regulate the output voltage $V_{OUT}$ despite fluctuations in the input voltage $V_{IN}$ or the load 290. Again, the controller 260 may monitor other characteristics associated with the power converter 200 as may be desired.

The power converter 200 further includes a circuit 230, coupled across the first tapped portion P1. In the illustrated embodiment, the circuit 230 includes an inductor L coupled to an intermediate tap IT between the first and second tapped portions P1, P2. The inductor L is configured to reduce current spikes in the first and second power switches M1, M2 of the primary switching circuit 220 caused by a reverse recovery phenomenon associated with the rectifier CR1. The circuit 230 further includes a diode D1 coupled to the inductor L via the first tapped portion P1. In the illustrated embodiment, the diode D1 is coupled to an end tap ET of the first tapped portion P1. The diode D1 is configured to clamp a voltage across the rectifier CR1. The presence of the first tapped portion P1 enables energy from the inductor L to be recovered within the power converter 200, rather than dissipated.

The operation of the secondary circuit 230 and the secondary active clamp 240 is analogous to that illustrated and described with respect to FIG. 1 until the turn ON of the diode D1.

The configuration of the circuit 230, however, allows the diode D1 to conduct to apply a voltage across the first capacitor C1 across the tapped primary winding. A current due to the magnetizing inductance of the transformer T1 that is flowing through the diode D1 decreases while a current through the inductor L increases. Since the inductor L is now in series with the first power switch M1, a peak current therethrough may be avoided.

The configuration of the circuit 230 therefore advantageously allows the power converter 200 to avoid an increase in a reverse voltage across the rectifier CR1 that was experienced in the power converter 100 illustrated and described with respect to FIG. 1.

Those skilled in the art should understand that the previously described embodiments of the a circuit for reducing losses associated with a power converter, the related method and the power converter are submitted for illustrative purposes only and other embodiments capable of reducing current spikes in a primary switching circuit of the power converter, effecting substantially zero voltage switching of a power switch of the primary switching circuit and clamping a voltage across a rectifier of the power converter are well within the scope of the present invention.

Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa. Further, while the principles of the present invention have been illustrated in the environment of an asymmetrical half-bridge power converter, other power converter topologies may advantageously employ the principles of the present invention and remain well within the scope of the present invention.

For a better understanding of power converters, see *Modern DC-to-DC Switchmode Power Converter Circuits*, by Rudolph P. Severns and Gordon Bloom, Van Nostrand Reinhold Company, New York, N.Y. (1985); and *Principles of Power Electronics*, by John G. Kassakian, Martin F. Schlect and George C. Verghese, Addison-Wesley Publishing Company, Reading, Mass. (1991). The above-listed references are incorporated herein by reference in their entirety.

Although the present invention has been described in detail, those skilled in the art should understand that they can make various changes, substitutions and alterations herein without departing from the spirit and scope of the invention in its broadest form.

What is claimed is:

1. For use with a power converter having a primary switching circuit coupled to a tapped primary winding of an isolation transformer and a rectifier coupled to a secondary winding of said isolation transformer, a circuit, coupled across a tapped portion of said tapped primary winding, comprising:

an inductor, configured to reduce current spikes in said primary switching circuit caused by a reverse recovery phenomenon associated with said rectifier and to effect substantially zero voltage switching of a power switch of said primary switching circuit; and a diode, coupled to said inductor via said tapped portion, configured to clamp a voltage across said rectifier, said tapped portion enabling energy from said inductor to be recovered within said power converter.

2. The circuit as recited in claim 1 wherein said power converter is an asymmetric half-bridge power converter.

3. The circuit as recited in claim 2 wherein said tapped portion is configured to deliver said energy from said inductor to a capacitor of said asymmetrical half-bridge power converter.

4. The circuit as recited in claim 1 wherein said inductor is coupled to an end tap of said tapped primary winding, said diode coupled to an intermediate tap of said tapped primary winding.

5. The circuit as recited in claim 1 wherein said diode is coupled to an end tap of said tapped primary winding, said inductor coupled to an intermediate tap of said tapped primary winding.

6. The circuit as recited in claim 1 wherein said power converter further comprises a controller configured to control conduction intervals of said power switch.

7. The circuit as recited in claim 6 wherein said controller is configured to monitor an output voltage of said power converter and to control said power switch in response thereto.

8. For use with a power converter having a primary switching circuit coupled to a primary winding of an isolation transformer and a rectifier coupled to a secondary winding of said isolation transformer, a method for reducing losses associated with said power converter, comprising:

reducing current spikes in said primary switching circuit caused by a reverse recovery phenomenon associated with said rectifier and effecting substantially zero voltage switching of a power switch of said primary switching circuit with a circuit, including an inductor, coupled across a tapped portion of said tapped primary winding; and clamping a voltage across said rectifier with a diode, coupled to said inductor via said tapped portion, said tapped portion enabling energy from said inductor to be recovered within said power converter.

9. The method as recited in claim 8 wherein said power converter is an asymmetric half-bridge power converter.

10. The method as recited in claim 9 further comprising delivering said energy from said inductor to a capacitor of said asymmetric half-bridge power converter via said tapped portion.

11. The method as recited in claim 8 wherein said inductor is coupled to an end tap of said tapped primary winding, said diode coupled to an intermediate tap of said tapped primary winding.

12. The method as recited in claim 8 wherein said diode is coupled to an end tap of said tapped primary winding, said inductor coupled to an intermediate tap of said tapped primary winding.

13. The method as recited in claim 8 further comprising controlling conduction intervals of said power switch.

14. The method as recited in claim 13 wherein said controlling comprises monitoring an output voltage of said power converter and controlling said power switch in response thereto.

15. A power converter, couplable to a source of electrical energy, comprising:

a primary switching circuit coupled to a tapped primary winding of an isolation transformer and having a power switch that conducts intermittently to transfer energy from said source to said tapped primary winding;

a rectifier coupled to a secondary winding of said isolation transformer and subject to a reverse recovery phenomenon;

a circuit, coupled across a tapped portion of said tapped primary winding, including:

an inductor, configured to reduce current spikes in said primary switching circuit caused by said reverse recovery phenomenon and to effect substantially zero voltage switching of said power switch, and a diode, coupled to said inductor via said tapped portion, configured to clamp a voltage across said rectifier, said tapped portion enabling energy from said inductor to be recovered within said power converter; and a controller, coupled to said power switch, that controls conduction intervals of said power switch.

16. The power converter as recited in claim 15 wherein said power converter is an asymmetric half-bridge power converter.

17. The power converter as recited in claim 16 wherein said tapped portion is configured to deliver said energy from said inductor to a capacitor of said asymmetrical half-bridge power converter.

18. The power converter as recited in claim 15 wherein said inductor is coupled to an end tap of said tapped primary winding, said diode coupled to an intermediate tap of said tapped primary winding.

19. The power converter as recited in claim 15 wherein said diode is coupled to an end tap of said tapped primary winding, said inductor coupled to an intermediate tap of said tapped primary winding.

20. The power converter as recited in claim 15 wherein said controller monitors an output voltage of said power converter and controls said conduction intervals of said power switch in response thereto.

* * * * *